United States Patent [19]
Snowhook

[11] Patent Number: 5,984,235
[45] Date of Patent: Nov. 16, 1999

[54] INTEGRATED LAUNCH AND SPACECRAFT PROPULSION SYSTEM

[75] Inventor: David P. Snowhook, Fairfax Station, Va.

[73] Assignee: Space Sciences Corporation, Fairfax Station, Va.

[21] Appl. No.: 08/884,220

[22] Filed: Jun. 27, 1997

[51] Int. Cl.[6] .................................................. B64G 1/10
[52] U.S. Cl. ...................................... 244/158 R; 244/172
[58] Field of Search .............................. 244/158 R, 159, 244/160, 176, 172

[56] References Cited

U.S. PATENT DOCUMENTS

| | | | |
|---|---|---|---|
| 3,040,520 | 6/1962 | Rae | 60/35.6 |
| 3,512,736 | 5/1970 | Weber et al. | 244/160 |
| 3,576,298 | 4/1971 | Barnett et al. | 244/1 |
| 3,700,193 | 10/1972 | Bradley | 244/155 |
| 3,756,024 | 9/1973 | Gay | 244/172 |
| 4,449,684 | 5/1984 | Hinds | 244/160 |
| 4,667,907 | 5/1987 | Hujsak et al. | 244/158 R |
| 4,807,833 | 2/1989 | Pori | 244/159 |
| 4,818,637 | 4/1989 | Roy | 244/158 R |
| 4,834,324 | 5/1989 | Criswell | 244/160 |
| 5,005,787 | 4/1991 | Cullingford | 244/159 |
| 5,190,246 | 3/1993 | Mac Conochie | 244/54 |
| 5,322,248 | 6/1994 | Ragab | 244/160 |
| 5,350,137 | 9/1994 | Henley | 244/158 R |
| 5,395,072 | 3/1995 | Nelson | 244/36 |
| 5,518,209 | 5/1996 | Chicoine et al. | 244/158 R |
| 5,526,999 | 6/1996 | Meston | 244/2 |
| 5,529,264 | 6/1996 | Bedegrew et al. | 244/118.2 |

FOREIGN PATENT DOCUMENTS 9-139217  5/1997  Japan .

OTHER PUBLICATIONS

Stanley et al. "Rocket–Powered Single–Stage Vehicle Configuration Selection and Design", Journal of Spacecraft and Rockets, vol. 31, No. 5, Sep. 1994, pp. 792–798.

Bono, "The Reusable Booster Paradox–Aircraft Technology or Operations?", Spaceflight, vol. 9, No. 11, Nov. 1967, pp. 379–387.

Freeman et al., "Design Options for Advanced Manned Launch Systems", Journal of Spacecraft and Rockets, vol. 32, No. 2, Mar. 1995, pp. 241–249.

Evans et al, "Advanced Space Propulsion Technology for Space Leadership", Technology for Space Leadership Conference Proceedings, Oct. 1987, pp. 135–141.

Robert Salkeld, et al., "Air launch for space shuttles", Acta Astro–nautica, vol. 2, No. 7/8, Jul. Aug. 1975, pp. 703–707 and 710–713.

Edward Lantz, "Efficient System for Transportation to and from Earth Orbit", Acta Astronautica, vol. 9, No. 11, 1982, pp. 671–673, 675, and 676.

*Primary Examiner*—Galen L. Barefoot
*Attorney, Agent, or Firm*—Fitzpatrick, Cella, Harper & Scinto

[57] ABSTRACT

A single-stage-to-orbit integrated launch and payload system is provided that includes a support structure, a propulsion system that is supported by the support structure and provides both launch propulsion and on-orbit payload propulsion, a control system that is supported by the support structure and controls both launch functions and on-orbit functions, and an electrical power system that is supported by the support structure and provides launch electrical power and on-orbit payload electrical power.

25 Claims, 4 Drawing Sheets

INTEGRATED LAUNCH AND SPACECRAFT PROPULSION SYSTEM

BACKGROUND OF THE INVENTION

1. Field of the Invention

The present invention relates to an integrated launch and spacecraft system. More specifically, the present invention relates to a single-stage-to-orbit (SSTO) launch system that is capable of launching a spacecraft into earth orbit and supporting the spacecraft while in orbit.

2. Description of the Related Art

Current spacecraft launch systems fall into one of two classes, recoverable and expendable. Although various recoverable launch systems have been proposed (see, e.g., U.S. Pat. Nos. 3,700,193; 3,576,298; 5,190,246; 5,322,248; and 5,526,999), the only two recoverable launch systems in use are the U.S. space shuttle and the Russian Buran. Both shuttle systems are only partially recoverable in that parts of the booster packages are not retrievable. Expendable launch systems include the European Ariane, the Lockheed Martin Atlas, the McDonald Douglas Delta, the Russian Proton, as well as many others. All existing and previously-developed launch systems, whether reusable or expendable, have been required to use multiple stages to achieve orbital velocity and altitude.

A multistage rocket employs two or more stages that are used in sequence to successively boost a payload into orbit (see, e.g., U.S. Pat. No. 5,529,264, the disclosure of which is incorporated herein by reference). The first stage must provide enough thrust to overcome gravity and to propel the vehicle to an intermediate altitude and velocity. When the first-stage propellants are expended, the tankage and structure used to house the first-stage propellants are jettisoned to reduce the mass of the vehicle. The second stage is then ignited to propel the vehicle to a higher altitude and to a greater velocity. Each stage is expended in sequence and jettisoned, with the final stage achieving the desired orbit and velocity. The final stage separates itself from the payload, which is then free to maneuver and perform its mission unencumbered by the launch vehicle. The reliability of such multistage systems is driven primarily by the reliability of the main thrusters and the staging events.

Multistage systems (of which the payload may be considered the last stage), however, have a number of drawbacks. Perhaps most importantly, multistage systems require one set of systems for the launch phase of their missions, and a second set of systems for the on-orbit phase of their missions. For example, because successive stages are jettisoned to reduce the mass of the vehicle for the succeeding stage, a separate, detachable propulsion system, and a separate detachable structure for supporting that propulsion system, must be provided for the launch phase of the mission in addition to corresponding systems for the on-orbit phase of the mission. Similarly, multistage systems typically have dual control systems and dual power systems that separately support the launch portion of their missions and the on-orbit portion of their missions. Further, multistage systems require complex mechanisms, structures, and electronics to accomplish staging events. The complexity and weight of these mechanisms has a negative impact on system reliability and cost. Accordingly, it is desirable to develop a launch system that eliminates the need for multistaging. Such a SSTO system, however, has not previously been realizable due to the limitations of material and electronics technologies.

Given sufficiently light-weight materials, a SSTO launch vehicle capable of achieving earth orbit could be built. The importance of using lightweight materials for launch systems is illustrated by FIG. 1, which depicts the relationship between overall launch mass and stage mass (tankage and structure) for a SSTO launch vehicle carrying a 10,000 lb payload. Industry experience has shown that the cost of a launch vehicle is roughly proportional to its mass at launch. Thus, as is evident from FIG. 1, a stage mass above roughly 0.1225 results in an infinite launch mass (i.e., a SSTO launch vehicle would not be feasible). However, if a stage mass of roughly 0.12 or less is achievable, then a SSTO launch vehicle becomes practical. The advantages gained by reducing the stage mass is further evident in FIG. 1 by noting that a twenty-percent reduction of stage mass from 0.12 to 0.10 will reduce the launch mass, and the launch cost, by nearly a factor of ten for a SSTO launch vehicle. Similarly, a reduction of stage mass by twenty-five percent from 0.10 to 0.08 will reduce the launch mass and, thus, the launch cost, by nearly an additional factor of two. Accordingly, improvements in technology that can produce relatively small improvements in stage mass fraction will profoundly affect the cost of launch systems, and will greatly enhance the feasibility of a SSTO launch vehicle.

The technologies required to achieve a stage mass of less than or equal to twelve percent are now being developed, and include light-weight graphite composite and aluminum-lithium cryogenic oxidizer/fuel tanks, and simplified light-weight liquid hydrogen/liquid oxygen thrusters. Advancements in other technologies benefitting the development of a SSTO system include miniaturized control valves for handling propellants, and miniaturized electronics for control systems and power management systems.

SSTO systems currently under study, such as the Delta Clipper, are being designed to be recoverable and reusable. Other SSTO systems (or near SSTO) that have been proposed likewise are designed to be recoverable and reusable (see, e.g., U.S. Pat. Nos. 3,756,024 and 5,395,072). However, the need for reentry hardware adds significantly to the technological difficulty and weight of the system. Moreover, such proposed SSTO systems do not eliminate the need for separate subsystems (such as control, propulsion, power, etc.) to support the launch, on-orbit, and reentry phases of their missions. As with multistage systems, the resulting increase in complexity and weight of these proposed systems is likely to adversely affect their reliability and cost effectiveness. Thus, SSTO systems currently under development suffer many of the drawbacks of the multistage systems they are meant to replace.

SUMMARY OF THE INVENTION

Accordingly, it is a principal object of the present invention to provide an integrated launch and payload system for economically and reliably delivering a payload to earth orbit and maneuvering the payload while in orbit.

These and other objects of the present invention are achieved by the present invention which, in one aspect, provides a single-stage-to-orbit integrated launch and spacecraft propulsion system. The system includes a support structure, a propulsion system that provides both launch propulsion and on-orbit spacecraft maneuvering propulsion, a control system that controls both launch functions and on-orbit spacecraft maneuvering functions, and an electrical power system that provides both launch power and on-orbit spacecraft maneuvering electrical power. The propulsion system, the control system, and the electrical power system are all supported by the support structure.

In another aspect, the present invention relates to a single-stage-to-orbit integrated launch propulsion and on-orbit payload propulsion system that includes single-stage propulsion means for providing both launch propulsion and on-orbit payload propulsion; power means for providing both launch electrical power and on-orbit payload electrical power; control means for controlling both launch functions and on-orbit payload functions; and structural means for supporting said single-stage propulsion means, said power means, and said control means.

In another aspect, the present invention relates to a single-stage-to-orbit integrated launch propulsion and on-orbit payload propulsion system that includes a launch subsystem; an on-orbit subsystem; a common support structure that supports both said launch subsystem and said on-orbit subsystem; a common propulsion system that provides propulsion to both said launch subsystem and said on-orbit subsystem and is supported by said common support structure; a common control system that controls both said launch subsystem and said on-orbit subsystem and is supported by said common support structure; and a common electrical power system that powers both said launch subsystem and said on-orbit subsystem and is supported by said common support structure.

In another aspect, the present invention relates to a single-stage spacecraft launching and on-orbit maneuvering system that includes an oxidizer tank storing liquid oxidizer for spacecraft launch and gaseous oxidizer for on-orbit spacecraft maneuvering; a fuel tank storing liquid fuel for spacecraft launch and gaseous fuel for on-orbit spacecraft maneuvering; propulsion means receiving oxidizer from said oxidizer tank and fuel from said fuel tank for propelling a spacecraft during launch and during on-orbit maneuvers; and a controller for controlling said propulsion means during launch and during on-orbit maneuvers.

In another aspect, the present invention relates to a method of launching and using a single-stage-to-orbit integrated launch and spacecraft maneuvering system. The method includes the steps of providing a support structure on which is supported a spacecraft, a propulsion system, a control system, and an electrical power system; launching the spacecraft supported on the support structure into earth orbit using the propulsion system, the control system, and the electrical power system provided in said providing step; and servicing the spacecraft launched in said launching step with the same support structure, propulsion system, control system, and electrical power system used in said launching step to launch the spacecraft.

These and other objects of the present invention will become apparent from the following detailed description of the preferred embodiments of the invention, read in conjunction with reference to the accompanying drawings.

DETAILED DESCRIPTION OF THE PREFERRED EMBODIMENTS

Figure 5:
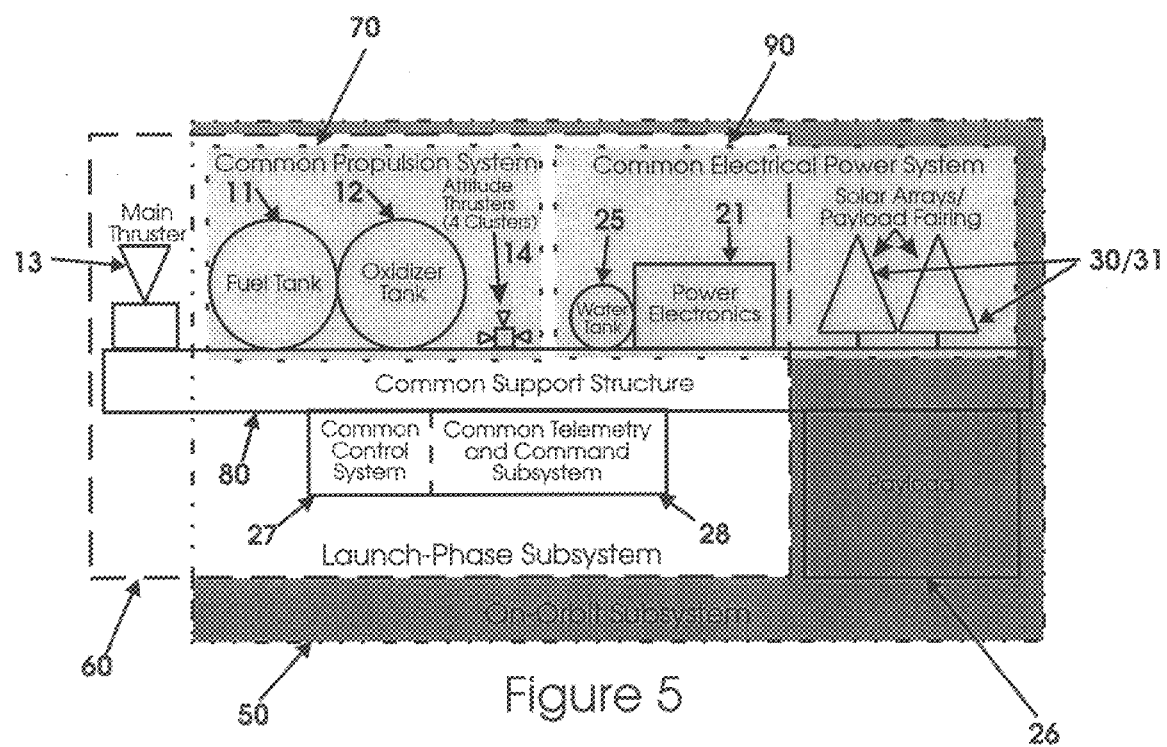
FIG. 5 is block diagram illustrating the relationship between various systems of one embodiment of the present invention.

The present invention provides an integrated launch and spacecraft system that uses a common propulsion system 70 and a common structure 80 for the launch phase and the on-orbit phase of its mission (FIG. 5). Moreover, the integrated launch and spacecraft system of the present invention may additionally include, inter alia, a common control system 27, a common electrical power system 90, and various other common subsystems for the launch phase and on-orbit phase of its mission.

Figure 1:
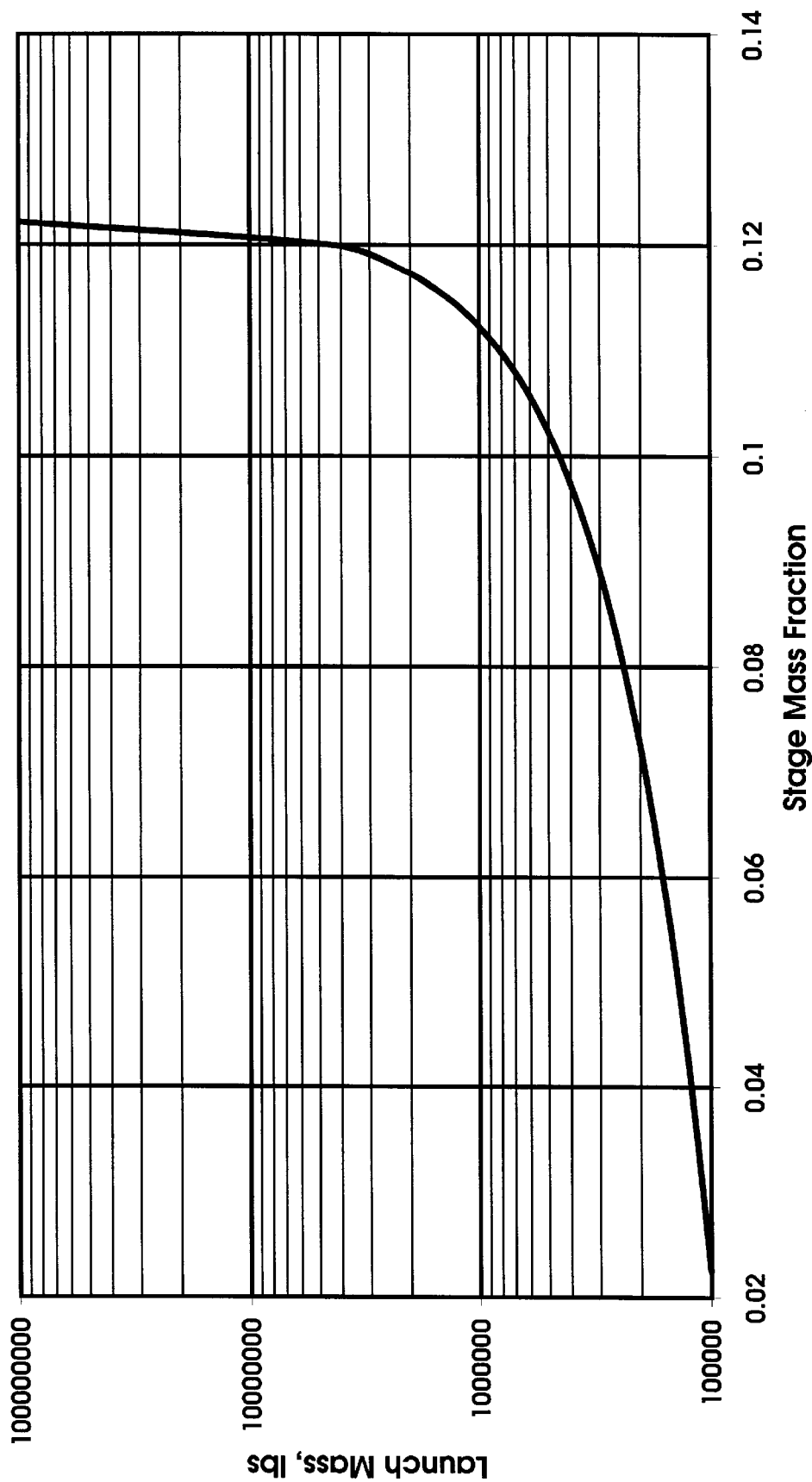
FIG. 1 depicts a plot of launch mass versus stage mass fraction.
Figure 2:
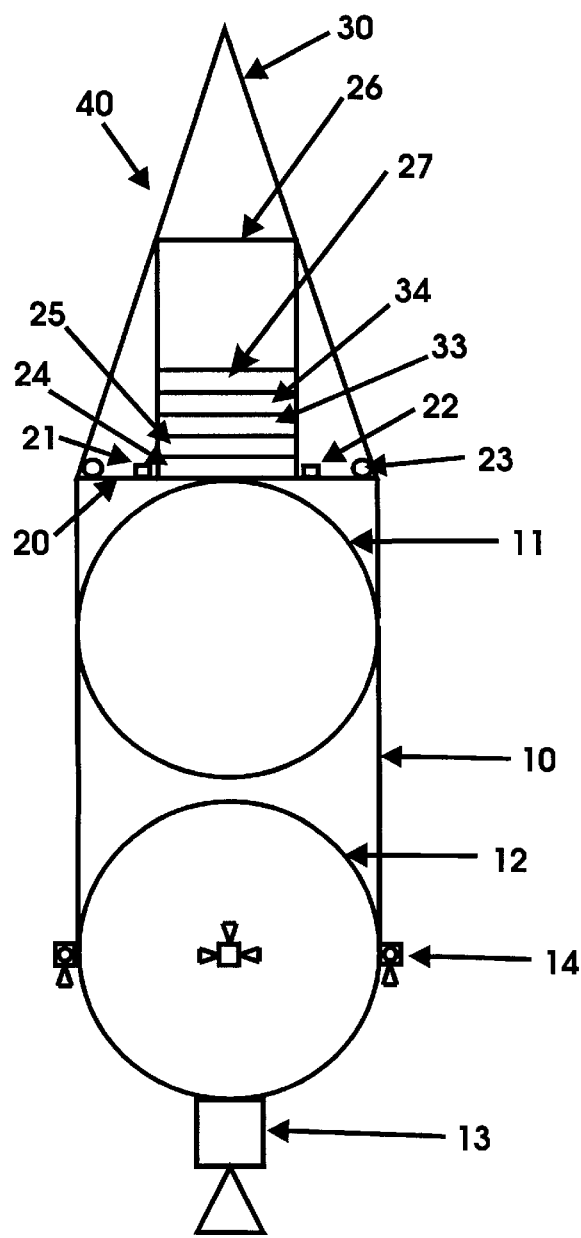
FIG. 2 is a schematic depiction of a first embodiment of the present invention.

As depicted in FIG. 2, the integrated launch and spacecraft system of the present invention has a support structure that includes an intertank structure 10 and a payload support structure 40, which includes a payload support structure base 20 and a payload fairing 30. The intertank structure 10 supports a main engine 13, attitude control devices 14, and propellant tanks 11, 12. As shown in FIG. 2, the propellant tanks 11, 12 may be spherical and may be mounted vertically in the intertank structure.

The payload support structure 40 is disposed at a forward end of the intertank structure 10 and supports the payload 26, which may include one or more of a communication system, a reconnaissance system, a sensing system, a weapon system, and the like, as well as various other equipment. For example, FIG. 2 depicts power management electronics 21, control system electronics 22, at least one fuel cell 24, navigation and guidance sensors 33, a microprocessor 34, and a water tank 25, all mounted to the payload support structure base 20. Of course, additional equipment and/or alternative equipment may also be mounted on the payload support structure base 20, as desired.

The payload fairing 30 is connected to the payload support structure base 20 via gimbals 23. Disposed on an inside surface of the payload fairing 30 are solar cells 32 creating solar arrays 31. Of course, other equipment may also be mounted on the inside surface of the payload fairing 30, as desired.

In one embodiment, the propellant tanks 11, 12 of the present invention include a single oxidizer tank and a single fuel tank. During the launch phase of the mission, the oxidizer tank preferably contains liquid oxygen and the fuel tank preferably contains liquid hydrogen. The propellant tanks feed oxidizer and fuel to the main engine 13 and the attitude control thrusters 14 during launch via plumbing and related hardware known to those of skill in the art. The main engine 13 is mounted at the aft end of the intertank structure 10, and may be gimballed to enable thrust vectoring during launch. The main engine 13 must provide sufficient thrust (approximately 1.15 times the total liftoff mass of the vehicle) to overcome gravity during the launch phase of the mission.

As an example, if the system starts with an estimated launch mass of 20,000 lbs, the required thrust at launch would equal approximately 23,000 lbs. Thus, in one embodiment, the main thruster may comprise a Pratt & Whitney RL10B' upgraded engine, which provides 23,000 lbs of thrust. The boost phase performance of this main engine is estimated at 437 sec average Isp. The total $\Delta V$ required to launch into a 100×100 Nmi circular orbit with an inclination of 23.5° from Cape Kennedy in Florida is estimated at 29,544 ft/sec. In this example, the mass of the vehicle attaining this orbit is estimated to be approximately 2446 lbs.

During launch, the fuel cell 24 uses oxygen supplied from the oxidizer tank and hydrogen supplied from the fuel tank to generate electrical power. The fuel cell 24 and the power management electronics 21, in conjunction with other known hardware such as electrical harness and the like, supply electrical power during launch (and initially on-orbit prior to deployment of the solar arrays 31) to the control system 27, as well as to various sensors, main thruster turbo pumps, main thruster gimbals, and thermal control heaters. The water generated by the fuel cell 24 during the launch phase (as well as the on-orbit phase) of the mission is stored in the water tank 25 for later re-conversion via electrical power from the solar arrays 31 to hydrogen and oxygen to be stored in the fuel tank and the oxidizer tank, respectively. Of course, the electrical power system may comprise conventional batteries or the like, rather than, or in addition to, a fuel cell and its associated elements. The power generated by the fuel cell 24 may also be supplied to the propulsion system to increase the combustion temperature of the main engine 13 to thereby increase its efficiency. Water produced as a by-product of electrical power generation by the fuel cell 24 is stored in the water tank 25. Water in the water tank 25 may be used to cool the fuel cell 24 when desired to thereby increase the efficiency of the fuel cell 24.

Vehicle control during launch is accomplished by the control system 27. The control system 27 may include a telemetry and command subsystem 28 (discussed below); navigation and guidance sensors 33; a microprocessor 34; mechanisms for deploying and positioning the solar arrays, antennas, sensors, and other such devices; actuators for accomplishing events such as firing pyrotechnics and latch valves; momentum wheels and/or reaction wheels; and control system electronics 22 including mechanism and actuator control electronics for controlling valve drivers, squib drivers, gimbal control drivers, momentum wheel drivers, etc. The navigation and guidance sensors 33 may be of any suitable type such as inertial guidance sensors, stellar tracking sensors, and the like. In conjunction with the navigation and guidance sensors 33, the control system electronics 22, and other hardware and software known to those of skill in the art, the microprocessor 34 controls maneuvering of the vehicle during the launch phase of the mission.

The telemetry and command subsystem 28 may include a radio frequency transmitter/receiver, antenna(s), encryption/decryption electronics, a central telemetry and command unit, and remote telemetry and command units as necessary, as is known by those of skill in the art. The telemetry and command electronics can be, but are not necessarily, integrated with the control electronics units and/or payload 26 or other units. The telemetry and command subsystem 28 provides the ability to command the vehicle and receive telemetry from the vehicle during the launch phase and transfer phase of the mission as well as during the on-orbit phase of the mission, by a ground station with the appropriate equipment and encryption/decryption codes and electronics.

Also during the launch portion of the mission, the payload fairing 30 protects the payload 26 from wind forces, vibration, and heat. The various equipment mounted to the payload support structure base 20 and to the inside surface of the payload fairing 30 are also protected during launch.

Upon reaching the desired orbit, the launch phase of the mission is concluded and the on-orbit phase of the mission begins. In contrast to conventional spacecraft, however, because the present invention provides an integrated launch vehicle and payload in which none of the launch subsystems or structure is jettisoned, all of the subsystems and structure available during the launch phase of the mission are also available during the on-orbit phase of the mission. One example of the overlapping relationship between launch phase subsystem 60 and on-orbit phase subsystem 50 and common support structure 80 is depicted in FIG. 5.

Figure 4:
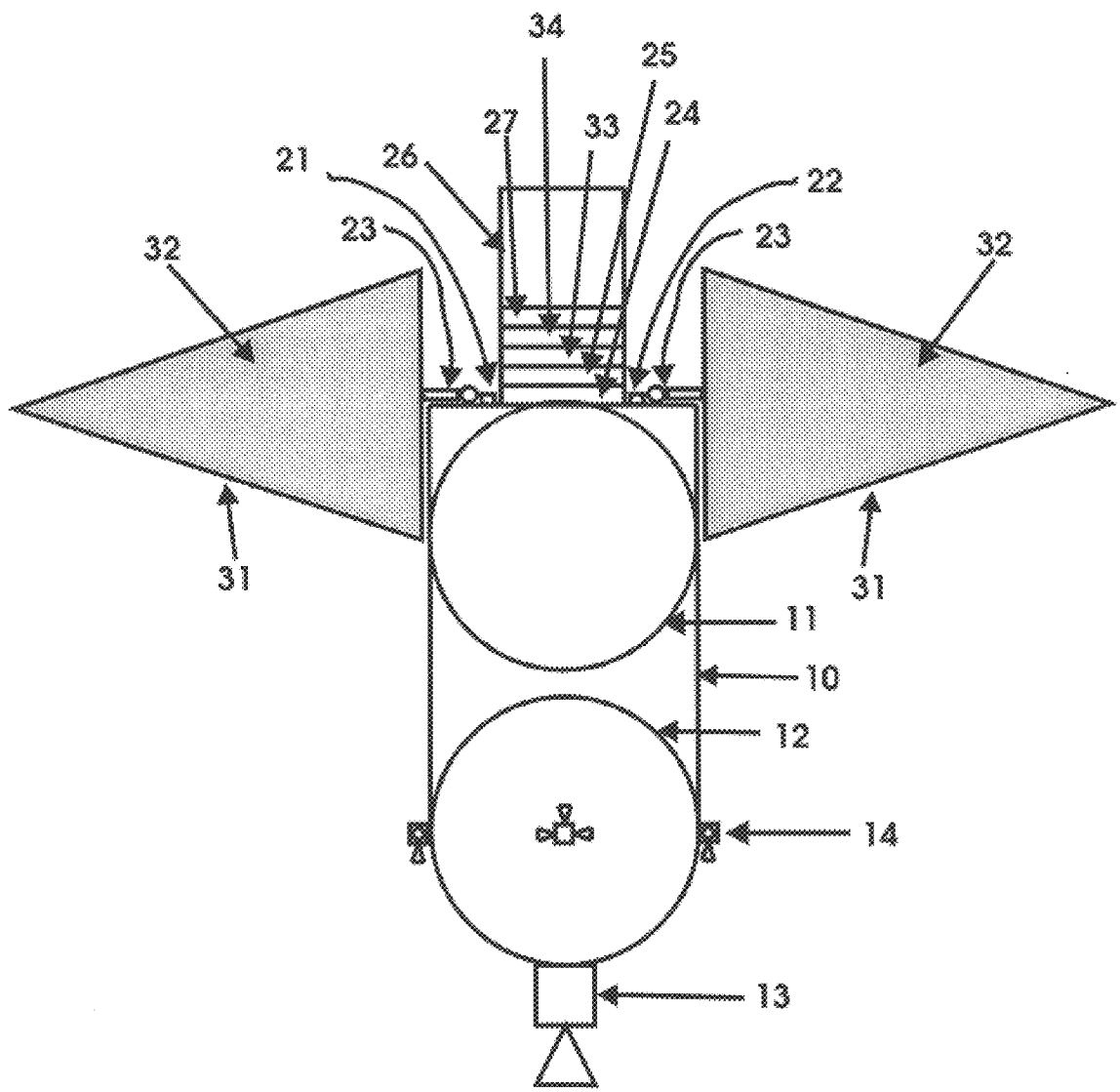
FIG. 4 is schematic depiction of a deployed payload fairing of the first embodiment of the present invention.

During the on-orbit phase of the mission, the payload fairing 30 is deployable by a deployment mechanism by virtue of its being gimbal-mounted to the payload support structure base 20 (FIG. 4). Because the payload fairing 30 is not required to separate from the vehicle, separation hardware may be eliminated, thus reducing the weight of the vehicle and simplifying the mechanical interface between the payload fairing 30 and the rest of the vehicle. Further, the payload fairing 30 is usable as a supporting structure for various payload equipment, including the solar cells 32.

Once the payload fairing 30 has been deployed, equipment such as antennas, sensors, and the like, may be deployed by deployment mechanisms as desired. The deployable equipment may be mounted on the payload fairing 30, the payload support structure base 20, and the intertank structure 10.

For example, the gimbals 23 allow the payload fairing 30 to be positioned to appropriately expose solar cells 32, which could be mounted on the inside surface of the payload fairing (FIG. 4). The solar cells 32 are then used to convert solar energy into electrical power. The electrical power generated by the solar cells 32 is used during the on-orbit phase of the mission to power the payload 26 and other equipment and systems, such as the control system, the electrical power system, etc. The electrical power generated by the solar cells 32 may also be used during the transfer phase of the mission where the vehicle is moved from an initial low earth orbit to a higher energy orbit. The electrical power could be used to power engines such as ion thrusters, arc-jet thrusters, and the like. Further, the electrical power generated by the solar cells 32 may be used to convert water in the water tank 25 into hydrogen and oxygen, which, in turn, may be used to perform the orbit transfers.

During the launch phase of the mission, water is stored in the water tank 25 because it takes less tank mass to carry water as opposed to hydrogen and oxygen. After the water is converted into hydrogen and oxygen by the power generated by the solar cells 32, it is stored in the propellant tanks 11, 12, to be used for on-orbit maneuvering.

The propellant tanks 11, 12 are thus used not only to supply propellant for the launch phase of the mission, but are also usable for storing and supplying propellant for the on-orbit phase of the mission, since the present invention provides a SSTO system in which the launch vehicle is not separated from the payload. While the propellant in this embodiment of the present invention comprises liquid oxygen and liquid hydrogen during the launch phase of the mission, during the on-orbit phase, the propellant comprises gaseous oxygen and gaseous hydrogen. The propellant tanks 11, 12, however, are suitable for storing both forms of the propellant and, thus, are effectively used during both launch and on-orbit portions of the mission to store gaseous and/or liquid hydrogen and oxygen.

Large maneuvers during the on-orbit phase of the mission may be accomplished by using propellant from the propellant tanks 11, 12 to drive the main engine 13, which remains part of the integrated vehicle even on orbit. This may be desirable to transfer the vehicle from one orbit to another. For example, the main engine may be used to supply the total $\Delta V$ required to move from a 100×100 Nmi circular orbit into a 300×300 Nmi circular orbit, which is estimated at 700 ft/sec. The mass of this exemplary vehicle attaining this orbit is estimated to be 2331 lbs (451 sec Isp).

Figure 3:
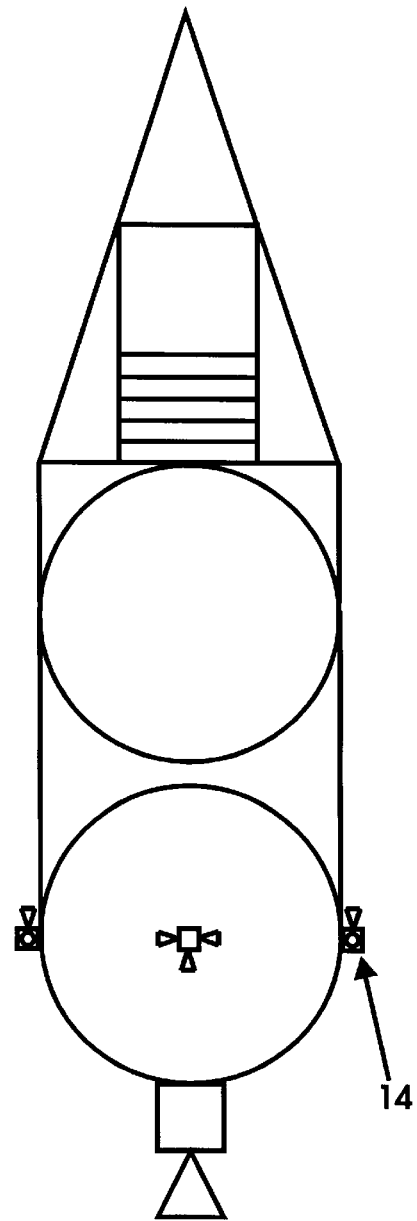
FIG. 3 is a schematic depiction of the first embodiment of the present invention.

Generally speaking, however, on-orbit maneuvering will be accomplished by the attitude control thrusters 14, which are also supplied with propellant from the propellant tanks 11, 12. In a preferred embodiment, the present invention provides for four sets of three thrusters, with the three thrusters being arranged roughly as shown in FIGS. 2 and 3. On-orbit attitude control thruster performance is estimated at 400 sec average Isp. As described above in reference to the main engine 13 during the launch phase of the mission, electrical power from the solar cells 32 and/or the fuel cell 24 may be used to improve the efficiency of the attitude thrusters (i.e., increase Isp above 400 sec). The total $\Delta V$ required for on-orbit station keeping, and the like, over a five-year life of the system, is estimated at 500 ft/sec for a vehicle in a 300 Nmi circular orbit. The total dry mass plus ullage of this exemplary vehicle at the end of five years is estimated at 2242 lb (or 11.21 percent of the launch mass, 400 sec Isp).

The hydrogen and oxygen stored in the propellant tanks 11, 12 may also be used to supply the fuel cell 24 during the on-orbit portion of the mission. While on orbit, the fuel cell 24 thus supplements the electrical power generated by the solar cells 32. For example, the fuel cell 24 may provide electrical power when the solar cells 32 are not exposed to the sun. Similarly to the launch phase of the mission, water produced by the fuel cell 24 as a by-product is stored in the water tank 25. The water may be used for on-orbit cooling, and may be converted back into hydrogen and oxygen by power generated by the solar cells 32 and then stored in the propellant tanks 11, 12.

In addition to controlling various functions during the launch phase of the mission, the control system is also used to accomplish maneuvering during the on-orbit phase of the mission. For example, guidance, navigation, and control may be accomplished with the navigation and guidance sensors 33, the microprocessor 34, etc., both in closed-loop and open-loop modes, as is known by those of skill in the art. Also during the on-orbit phase of the mission, the control system provides real time attitude control which may be accomplished using a combination of attitude thruster maneuvering, adjustment of the momentum or reaction wheels, and/or spin stabilization, as is known by those of skill in the art. The control system also positions the solar arrays, antennas, sensors, and/or other such devices during the on-orbit phase of the mission. Such positioning is accomplished via commanding of the control system electronics 22 by the microprocessor 34 using both closed-loop and/or open-loop modes, as is know by those of skill in the art.

Based on the foregoing, the usable payload mass for the integrated launch vehicle and spacecraft system of the present invention (using technology currently under development) is estimated to be between 2 and 3 percent of the launch mass of the vehicle, i.e., 400 to 600 lbs for the example discussed herein. The use of common propulsion, control, power, and structural systems in the present invention, however, means that the payload mass does not need to include mass associated with separate propulsion, control, and power systems for dedicated use by the payload in orbit. Further, the payload mass of the present invention includes less mass associated with support structure than that of a conventional design. Accordingly, to provide the same benefit of a 500 lb payload with the present invention, a conventional spacecraft would need to weigh approximately 750 lbs.

The foregoing embodiment of the present invention provides for a non-separable payload fairing 30 along with a single-stage propulsion system, thus eliminating all staging events associated with conventional designs. However, an alternative embodiment may include a separable fairing, if desired, without sacrificing the benefits resulting from the provision of common structural, propulsion, control, and power systems for the launch and on-orbit phases of the integrated system of the present invention.

Further, an alternative embodiment may include separate control, and/or power systems without sacrificing the benefits resulting from having a common structure and a common propulsion system. Also, an alternative embodiment need not use a multi-function fuel cell as the power storage system (e.g., conventional batteries may be used) without sacrificing the benefits resulting from having a common structure, propulsion, control, and/or power systems. Moreover, although the present invention has been described as including various particular subsystems, certain subsystems may be integrated or segregated as necessary.

Because the integrated system of the present invention reaches earth orbit intact, components of the vehicle that are utilized for the launch phase of the mission may also be utilized for the on-orbit portion of the mission. Thus, a single propulsion system, a single control system, a single power system, and a single support structure are able to service the entire mission of the vehicle. By this arrangement, system and hardware redundancies are eliminated, thus simplifying the design of the vehicle and decreasing the weight and cost of the vehicle. These advantages are realized without requiring any portion of the vehicle to be recoverable or reusable, which further increases each of these advantages.

As mentioned above, the reliability of launch systems is driven primarily by the reliability of the main thrusters and the staging events. The system described herein provides greatly enhanced reliability due to the reduction of main thrusters from five or more for traditional multistage systems to a single thruster, and the complete elimination of staging events. For a typical multistage launch system with five thrusters and three staging events, each thruster and each staging event has a reliability of approximately 99.5 percent. Therefore, a typical multistage launch system would have an overall reliability of approximately $0.995^8$, which results in a reliability of 96.07 percent. Other SSTO systems currently under development would not have a reliability as high as the system described herein, since they have at least one separation event (payload from launch vehicle), must re-enter the atmosphere and return to the ground (an event as unreliable as a staging event or thruster reliability), and often use more than one thruster (though multiple thrusters in some designs are not a significant reliability reducing feature). Consequently, the system described herein is potentially the most reliable launch system yet conceived due to the minimization of hardware and events that most affect reliability.

More than one main thruster may be utilized in the present invention and/or the main thruster(s) could be jettisoned prior to reaching low Earth orbit, possibly to be recovered on the ground, without sacrificing the benefits of improved reliability due to a reduction of the number of main thrusters and staging events. Moreover, although initially envisioned to provide a launch system for placing payloads in low to intermediate earth orbit, the integrated launch and spacecraft system of the present invention is equally suitable for launching a payload to geosynchronous orbit. In order to accomplish this, a first stage providing approximately 15,000 ft/sec of $\Delta V$ may be required. Nevertheless, the provision of a common propulsion system, a common control system, a common electrical power system, and a common structure for the upper stage of the launch system and the payload offers the same advantages for a geosynchronous system that inure to a low to intermediate earth orbit system.

The present invention can also be used as a component of a space station or a deep space vehicle such as would be used for a mission to Mars. The present invention could provide orbit maneuvering, attitude control, telemetry and command, and/or power generation as a component of said systems. Although initially envisioned to be expendable, the present invention could also, if refueled on-orbit or launched from a first stage, perform an inter-planetary mission such as a mission to Venus, Mars, etc.

The performance of additional embodiments of the present invention could be improved by the application of additional advanced technologies. Such embodiments could include the use of lighter weight materials and/or electronics to either increase the on-orbit mass available for use as payload or decrease the launch mass for a given payload mass; the use of electrical propulsion (such as ion propulsion, etc.) to perform orbital maneuvering, attitude control, and station keeping; the use of improved propulsion systems such as air breathing, tri or multi-fuel, and/or nuclear powered, etc. to increase performance, lower launch mass, or enable other missions such as deep space missions, etc.; and the use of booster stages such as an expendable first stage, a reusable first stage, an airplane, or other such device to improve performance or enable other missions. The present invention could also perform missions to geosynchronous or other high energy orbits and interplanetary missions without the aid of a first stage with the application of one or more of these advanced technologies.

While the present invention has been described with respect to what is presently considered to be the preferred embodiments, the present invention is not limited to the disclosed embodiments. Rather, the present invention covers various modifications and equivalent arrangements included within the spirit and scope of the appended claims. The scope of the appended claims is to be accorded the broadest interpretation so as to encompass all such modifications and equivalent structures and functions.

What is claimed is:

1. A single-stage-to-orbit integrated launch and spacecraft system comprising:

a support structure;

a spacecraft payload for performing on-orbit payload functions;

a propulsion system that is supported by said support structure and provides both launch propulsion and on-orbit spacecraft maneuvering propulsion;

a unitary control system that is supported by said support structure and controls launch functions, on-orbit spacecraft maneuvering functions and the on-orbit payload functions; and an electrical power system that is supported by said support structure and provides launch electrical power, on-orbit spacecraft maneuvering electrical power and on-orbit payload electrical power.

2. A system according to claim 1, wherein said propulsion system has a single-stage that includes an oxidizer tank, a fuel tank, a main engine, and at least one attitude control thruster; and wherein said oxidizer tank supplies an oxidizer and said fuel tank supplies a fuel to said main engine during launch and to said at least one attitude control thruster on orbit.

3. A system according to claim 2, further comprising a spacecraft that is launched by said system, wherein the oxidizer comprises liquid oxygen during launch and gaseous oxygen on orbit, and the fuel comprises liquid hydrogen during launch and gaseous hydrogen on orbit; wherein said electrical power system includes a fuel cell; and wherein said oxidizer tank supplies oxygen and said fuel tank supplies hydrogen to said fuel cell, said fuel cell providing electrical power to said propulsion system at least during launch and to said spacecraft at least on orbit.

4. A system according to claim 3, further comprising a pump, wherein said electrical power system further includes power management electronics, solar cells, and a water tank; wherein said fuel cell produces electrical power that is provided to said propulsion system by said power management electronics to increase a combustion temperature of said main engine, said fuel cell thereby producing water that is pumped by said pump and stored in said water tank and is circulated by said pump to cool said fuel cell; wherein said solar cells produce electric power on orbit that is used by said power management electronics to power said spacecraft and to convert water in said water tank to hydrogen and oxygen, which is then pumped by said pump and stored in said fuel tank and said oxidizer tank, respectively; and wherein said water tank stores water during launch that is converted using electricity generated by said solar cells to hydrogen and oxygen on orbit.

5. A system according to claim 1, wherein said support structure includes a payload support structure having a gimballed payload fairing, said payload support structure supporting payload equipment including control electronics, telemetry and command electronics, power management electronics, at least one fuel cell, and at least one antenna; wherein solar cells are mounted on an inside surface of said gimballed payload fairing; and wherein said gimballed payload fairing protects said payload and said payload equipment from pressure, heat, and vibration at least during launch.

6. A system according to claim 5, further comprising deployment mechanisms, wherein said gimballed payload fairing is deployed by said deployment mechanisms on orbit to thereby deploy said at least one antenna and said solar cells; and wherein said payload includes at least one of a communication system, a reconnaissance system, a sensing system, and a weapon system.

7. A single-stage-to-orbit integrated launch and on-orbit payload system comprising:

a payload for performing on-orbit payload functions;

single-stage propulsion means for providing both launch propulsion and on-orbit payload propulsion;

power means for providing both launch electrical power and on-orbit payload electrical power;

unitary control means for controlling both launch functions and the on-orbit payload functions; and structural means for supporting said single-stage propulsion means, said power means, and said control means.

8. A system according to claim 7, wherein said propulsion means includes an oxidizer tank, a fuel tank, a main engine, and at least one attitude control thruster; and wherein said oxidizer tank supplies an oxidizer and said fuel tank supplies a fuel to said main engine during launch and to said at least one attitude control thruster on orbit.

9. A system according to claim 8, wherein the oxidizer comprises liquid oxygen during launch and gaseous oxygen on orbit, and the fuel comprises liquid hydrogen during launch and gaseous hydrogen on orbit; wherein said power means includes a fuel cell; and wherein said oxidizer tank supplies oxygen and said fuel tank supplies hydrogen to said fuel cell, said fuel cell providing electrical power to said propulsion means at least during launch and to said payload at least on orbit.

10. A system according to claim 9, further comprising a pump, wherein said power means further includes power management electronics, solar cells, and a water tank; wherein said fuel cell produces electrical power that is provided to said propulsion means by said power management electronics to increase a combustion temperature of said main engine, said fuel cell thereby producing water that is pumped by said pump and stored in said water tank and is circulated by said pump to cool said fuel cell; wherein said solar cells produce electric power on orbit that is used by said power management electronics to power said payload and to convert water in said water tank to hydrogen and oxygen, which is then pumped by said pump and stored in said fuel tank and said oxidizer tank, respectively; and wherein said water tank stores water during launch that is converted using electricity generated by said solar cells to hydrogen and oxygen on orbit.

11. A system according to claim 7, wherein said structural means includes a payload support structure having a gimballed payload fairing, said payload support structure supporting payload equipment including control electronics, telemetry and command electronics, power management electronics, at least one fuel cell, and at least one antenna; wherein solar cells are mounted on an inside surface of said gimballed payload fairing; and wherein said gimballed payload fairing protects said payload and said payload equipment from pressure, heat, and vibration at least during launch.

12. A system according to claim 11, further comprising deployment mechanisms, wherein said gimballed payload fairing is deployed by said deployment mechanisms on orbit to thereby deploy said at least one antenna and said solar cells; and wherein said payload includes at least one of a communication system, a reconnaissance system, a sensing system, and a weapon system.

13. A single-stage-to-orbit integrated launch and on-orbit payload system comprising:

a payload for performing on-orbit payload functions;

a launch subsystem;

an on-orbit subsystem;

a common support structure that supports both said launch subsystem and said on-orbit subsystem;

a common propulsion system that provides propulsion to both said launch subsystem and said on-orbit subsystem and is supported by said common support structure;

a common, unitary control system that controls said launch subsystem, said on-orbit subsystem and said payload to perform the on-orbit payload functions, said control system being supported by said common support structure; and a common electrical power system that powers said launch subsystem, said on-orbit subsystem, and said payload while on-orbit and that is supported by said common support structure.

14. A system according to claim 13, wherein said launch subsystem includes a main engine, said common propulsion system, said common control system, and said common support structure.

15. A system according to claim 13, wherein said on-orbit subsystem includes said payload, said common propulsion system, said common control system, and said common support structure.

16. A system according to claim 14, wherein said on-orbit subsystem includes said payload, said common propulsion system, said common control system, and said common support structure.

17. A system according to claim 16, wherein said common propulsion system includes propellant tanks, at least one attitude control thruster, and plumbing, and wherein said common control system includes control system electronics, navigation and guidance sensors, a telemetry and command subsystem, and electrical harness.

18. A single-stage spacecraft launching and on-orbit maneuvering system comprising:

an oxidizer tank storing liquid oxidizer for spacecraft launch and gaseous oxidizer for on-orbit spacecraft maneuvering;

a fuel tank storing liquid fuel for spacecraft launch and gaseous fuel for on-orbit spacecraft maneuvering;

propulsion means receiving the liquid oxidizer from said oxidizer tank and the liquid fuel from said fuel tank for propelling a spacecraft during launch and receiving the gaseous oxidizer from said oxidizer tank and the gaseous fuel from said fuel tank for propelling the spacecraft during on-orbit maneuvers; and a controller for controlling said propulsion means to utilize the liquid oxidizers and the liquid fuel during launch and to utilize the gaseous oxidizer and the gaseous fuel during on-orbit maneuvers.

19. A system according to claim 18, further comprising an electrical hydrolysis device, solar cells, and a pump; wherein said propulsion means includes at least one of an engine and an attitude control thruster, and wherein said electrical hydrolysis device uses electrical power generated by said solar cells to produce gaseous oxidizer and gaseous fuel which are pumped by said pump to said oxidizer tank and to said fuel tank, respectively, after the spacecraft is on orbit.

20. A method of launching and using a single-stage-to-orbit integrated launch and spacecraft maneuvering system, said method comprising the steps of:

providing a support structure on which is supported a spacecraft, a propulsion system, a unitary control system, and an electrical power system;

providing a spacecraft payload for performing on-orbit payload functions;

launching the spacecraft payload and the spacecraft supported on the support structure into earth orbit using the propulsion system, the unitary control system, and the electrical power system provided in said providing step; and servicing, while on-orbit, the spacecraft payload and the spacecraft launched in said launching step with the same support structure, propulsion system, unitary control system, and electrical power system used in said launching step to launch the spacecraft payload and the spacecraft, wherein said servicing step enables the spacecraft payload to perform the on-orbit payload functions.

21. A single-stage-to-orbit integrated launch and spacecraft system comprising:

a spacecraft payload including payload equipment;

a main support structure including a payload support structure having a gimballed payload fairing, said payload support structure supporting said payload equipment, wherein said gimballed payload fairing protects said payload and said payload equipment from pressure, heat, and vibration at least during launch;

a propulsion system supported by said main support structure;

a control system supported by said main support structure; and an electrical power system supported by said main support structure.

22. A single-stage-to-orbit integrated launch and spacecraft system according to claim 21, wherein said payload equipment includes control electronics, telemetry and command electronics, power management electronics, at least one fuel cell, and at least one antenna.

23. A single-stage-to-orbit integrated launch and spacecraft system according to claim 22, further comprising deployment mechanisms, wherein said gimballed payload fairing is deployed by said deployment mechanisms on orbit to thereby deploy said at least one antenna; and wherein said payload includes at least one of a communication system, a reconnaissance system, a sensing system, and a weapon system.

24. A single-stage-to-orbit integrated launch and spacecraft system according to claim 21, wherein solar cells are mounted on an inside surface of said gimballed payload fairing.

25. A single-stage-to-orbit integrated launch and spacecraft system according to claim 24, further comprising deployment mechanisms, wherein said gimballed payload fairing is deployed by said deployment mechanisms on orbit to thereby deploy said solar cells; and wherein said payload includes at least one of a communication system, a reconnaissance system, a sensing system, and a weapon system.

* * * * *